US010069824B2

United States Patent
Dascola

(10) Patent No.: US 10,069,824 B2
(45) Date of Patent: Sep. 4, 2018

(54) BIOMETRIC SIGNATURE AUTHENTICATION AND CENTRALIZED STORAGE SYSTEM

(71) Applicant: Branch Banking and Trust Company, Winston-Salem, NC (US)

(72) Inventor: Michael Anthony Dascola, Raleigh, NC (US)

(73) Assignee: Branch Banking and Trust Company, Winston-Salem, NC (US)

(*) Notice: Subject to any disclaimer, the term of this patent is extended or adjusted under 35 U.S.C. 154(b) by 148 days.

(21) Appl. No.: 15/153,031

(22) Filed: May 12, 2016

(65) Prior Publication Data

US 2016/0366128 A1 Dec. 15, 2016

Related U.S. Application Data

(60) Provisional application No. 62/160,298, filed on May 12, 2015.

(51) Int. Cl.
*H04L 29/06* (2006.01)
*H04L 9/32* (2006.01)
*G06F 21/32* (2013.01)

(52) U.S. Cl.
CPC .......... *H04L 63/0861* (2013.01); *G06F 21/32* (2013.01); *H04L 9/3231* (2013.01)

(58) Field of Classification Search
CPC .... H04L 9/3231; H04L 63/0861; G06F 21/32
See application file for complete search history.

(56) References Cited

U.S. PATENT DOCUMENTS

| 7,689,833 | B2* | 3/2010 | Lange | A61B 5/04525 |
| | | | | 713/186 |
| 8,902,045 | B1* | 12/2014 | Linn | G06F 21/32 |
| | | | | 340/5.53 |
| 8,922,342 | B1* | 12/2014 | Ashenfelter | G07C 9/00087 |
| | | | | 340/5.52 |
| 8,924,736 | B1* | 12/2014 | Dusan | G06F 21/32 |
| | | | | 340/5.52 |
| 9,119,539 | B1* | 9/2015 | Dotan | A61B 5/02438 |
| 9,654,468 | B2* | 5/2017 | Buer | H04L 63/0861 |
| 9,830,440 | B2* | 11/2017 | Randall | G06F 21/32 |

(Continued)

OTHER PUBLICATIONS

H. A. Garcia-Baleon and V. Alarcon-Aquino, "Cryptographic Key Generation from Biometric Data Using Wavelets," 2009 Electronics, Robotics and Automotive Mechanics Conference (CERMA), Cuernavaca, Morelos, 2009, pp. 15-20.*

(Continued)

*Primary Examiner* — Kari L Schmidt
(74) *Attorney, Agent, or Firm* — Kilpatrick Townsend & Stockton LLP

(57) ABSTRACT

A biometric authentication system may include a centralized database including stored biometric signature information for authenticating a user of one or more external systems. The biometric authentication system may extract data attributes from a biometric signature of the user and compare them to the stored biometric signature information in the database. The biometric authentication system may identify user identifier information associated with a signature key stored of the stored biometric signature information that matches the data attributes to authenticate the user to access secure information.

14 Claims, 5 Drawing Sheets

(56) References Cited

U.S. PATENT DOCUMENTS

| | | | | |
|---|---|---|---|---|
| 2003/0060689 A1* | 3/2003 | Kohls | ............... | A61B 5/0002 600/300 |
| 2005/0211784 A1* | 9/2005 | Justin | ............... | G06K 19/0718 235/492 |
| 2006/0136744 A1* | 6/2006 | Lange | ............... | G06K 9/00536 713/186 |
| 2009/0240950 A1* | 9/2009 | Suzuki | ............... | G06F 21/32 713/186 |
| 2014/0115324 A1* | 4/2014 | Buer | ............... | H04L 9/3231 713/156 |
| 2014/0165184 A1* | 6/2014 | Lange | ............... | G06F 21/32 726/19 |
| 2014/0181932 A1* | 6/2014 | Patey | ............... | H04L 9/0866 726/6 |
| 2014/0188770 A1* | 7/2014 | Agrafioti | ............... | A61B 5/117 706/13 |
| 2015/0067822 A1* | 3/2015 | Randall | ............... | G06F 21/32 726/17 |
| 2015/0373019 A1* | 12/2015 | El Saddik | ............... | H04L 63/0861 340/5.52 |
| 2016/0063233 A1* | 3/2016 | Bae | ............... | A61B 5/04012 726/19 |
| 2016/0182503 A1* | 6/2016 | Cheng | ............... | H04L 63/0861 726/7 |

OTHER PUBLICATIONS

Sriram, Janani C., et al. "Activity-aware ECG-based patient authentication for remote health monitoring." Proceedings of the 2009 international conference on Multimodal interfaces. ACM, 2009, pp. 297-304.*

Tahat, Ashraf A. "Mobile messaging services-based personal electrocardiogram monitoring system." International Journal of Telemedicine and Applications 2009 (2009): 4.*

* cited by examiner

BIOMETRIC SIGNATURE AUTHENTICATION AND CENTRALIZED STORAGE SYSTEM

CROSS-REFERENCE TO RELATED APPLICATION

This claims priority to U.S. Provisional Application Ser. No. 62/160,298, filed May 12, 2015 and titled "System for Biometric Signature Information Storage and Authentication," the contents of which are incorporated herein by reference.

TECHNICAL FIELD

The present disclosure relates generally to biometric authentication, and more particularly, though not necessarily exclusively, to biometric authentication using a biometric signature key stored in a centralized database.

BACKGROUND

A human heart includes unique wave patterns in the electrical activity. In electrocardiography, the human heart may be monitored to record electrical activity over a period of time. The electrical activity may be recorded using one or more electrodes having contact with the individual's skin. The electrodes may detect electrical changes on the skin due the depolarization from the heart muscle during each heartbeat. An electrocardiogram ("EKG") may be used to trace the heart's electrical activity into line tracings. The EKG may be based on the electrical changes of the heart and may visually represent the biometric signature of the individual. The biometric signature may be dependent on various characteristics of the individual and the heart muscle of the individual being monitored (e.g., heart size, heart chamber structure, prior heart damage, etc.). The combination of characteristics resulting in the electrical changes may yield a biometric signature that is unique for each individual.

SUMMARY

In some aspects, a biometric authentication system may include a centralized database communicatively that is couplable to one or more external systems and includes stored biometric signature information for authenticating a user of the one or more external systems. The biometric authentication system may also include a processor communicatively coupled to the centralized database. The biometric authentication system may also include a memory communicatively coupled to the processor and including instructions executable by the processor for causing the processor to extract a first set of data attributes from a biometric signature of the user. The biometric signature may correspond to electrical activity of the user's heart obtained by a biometric sensor in physical contact with the user. The instructions may also be executable by the processor for causing the processor to compare one or more data attributes in the first set of data attributes to the stored biometric signature information in the centralized database. The stored biometric signature information may include a plurality of signature keys, each signature key of the plurality of signature keys corresponding to a stored set of data attributes extracted from corresponding biometric signatures of a plurality of users. The instructions may also be executable by the processor for causing the processor to identify user identifier information associated with a stored signature key of the plurality of signature keys matching the first set of data attributes. The instructions may also be executable by the processor for causing the processor to authenticate, based on a match between the one or more data attributes and the stored signature key, the user to access secure information associated with the user identifier information.

In additional aspects, a method may include receiving a biometric signature from a biometric sensor. The biometric signature corresponding to electrical activity of a user's heart measured by the biometric sensor. The method may also include extracting a first set of data attributes from the biometric signature. The method may also include comparing one or more data attributes in the first set of data attributes to stored biometric signature information in a centralized database accessible to one or more systems. The stored biometric signature information may include a plurality of signature keys, each signature key of the plurality of signature keys corresponding to a stored set of data attributes extracted from corresponding biometric signatures of a plurality of users. The method may also include identifying user identifier information associated with a stored signature key of the plurality of signature keys matching the first set of data attributes. The method may also include authenticating, based on a match between the first set of data attributes and the stored signature key, the user to access secure information associated with the user identifier information.

In further aspects, a non-transitory computer-readable medium comprising program code executable by a processor to cause the processor to receive a biometric signature from a biometric sensor. The biometric signature may correspond to electrical activity of a user's heart measured by the biometric sensor. The program code may also be executable by the processor to cause the processor to extract a first set of data attributes from the biometric signature. The program code may also be executable by the processor to cause the processor to compare one or more data attributes in the first set of data attributes to stored biometric signature information in a centralized database accessible to one or more systems. The stored biometric signature information may include a plurality of signature keys, each signature key of the plurality of signature keys corresponding to a stored set of data attributes extracted from corresponding biometric signatures of a plurality of users. The program code may also be executable by the processor to cause the processor to identify user identifier information associated with a stored signature key of the plurality of signature keys matching the first set of data attributes. The program code may also be executable by the processor to cause the processor to authenticate, based on a match between the one or more data attributes and the stored signature key, the user to access secure information associated with the user identifier information.

DETAILED DESCRIPTION

Figure 1:
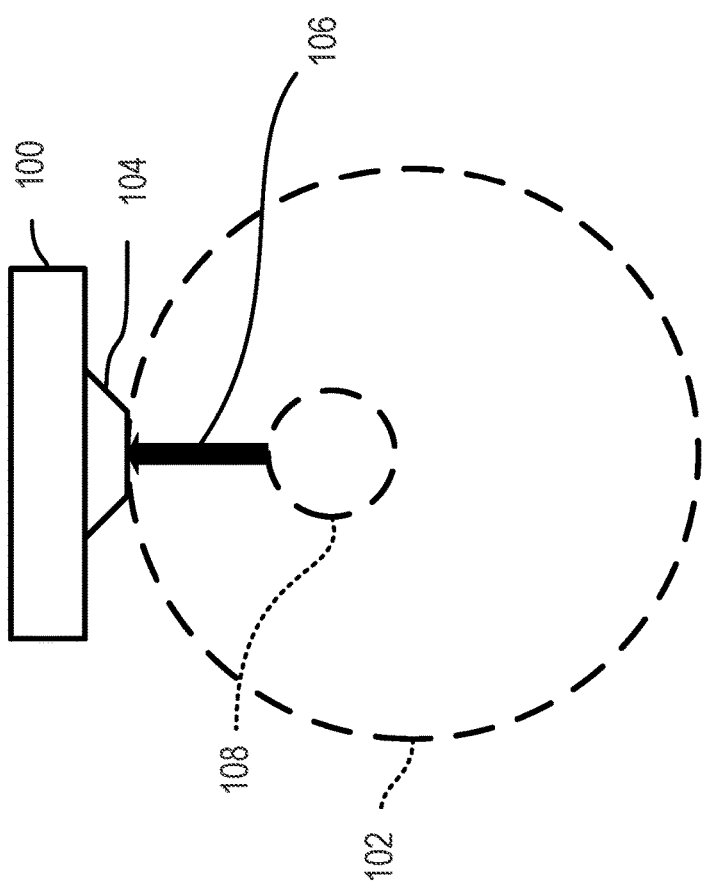
FIG. 1 is a cross-sectional schematic diagram of an environment in which a biometric signature may be obtained according to some aspects of the present disclosure.

Certain aspects and examples of the present disclosure relate to generating a biometric signature key based on a unique heartbeat of a user and storing the biometric signature key in a centralized database that is accessible via a network to authenticate a user. In one example, a sensor of a user device may obtain a biometric signature from a user. The biometric signature may include a trace of electrical activity corresponding to the user's heartbeat. A system may receive the biometric signature from the user device via a network and extracts unique data attributes of the biometric signature. The system may save the unique data attributes as a signature key for the biometric signature of the user's heartbeat in a centralized database that is accessible by one or more systems having secure information, such as information corresponding to a personal account held by the user. The signature key may be stored in the centralized database in a manner that associates the signature key with the user.

In response to future requests by the user to view secure information on the user device, the sensor may obtain a second biometric signature from the user and transmits the second biometric signature to the system. The system may extract unique data attributes from the second biometric signature and compare them to an array of signature keys stored in the centralized database, each signature key in the array corresponding to a different user. If the system determines a match between the unique data attributes extracted from the second biometric signature and a stored signature key in the array, the system may identify user information corresponding to the user and associated with the stored signature key in the centralized database. The system may authenticate the user to view secure information associated with the user information. In some aspects, the system may transmit the secure information to the user device via the network for display. If the system may not determine a match between the unique data attributes and a stored signature key, the system does not allow secure information to be displayed on the user device.

Authenticating a user using biometric signature information may improve the quality of authentication beyond the capabilities of systems that may use conventional methods of authentication such as usernames, passwords, and security questions. Since the biometric signature information is unique to each user, authentication using biometric signature information may provide heightened confidence that the user is authorized to access secure information.

Using a centralized database to store biometric information may allow multi-system platforms having multiple systems in communication with the centralized database, each system having different types of secure information, to authenticate the user from each system using the biometric information. For example, the centralized database may reduce or eliminate a need for separate copies of the biometric signature or the signature key for each user of each system to be stored in separate system databases. A centralized database having a single copy of the signature key may conserve data storage space in the multi-system platform, collectively, as well as reduce labor costs and time in coordinating authentication systems for each of the systems.

Using a centralized database according to some aspects may also allow authentication in environments beyond a user device. For example, a multi-system platform may be hosted by a financial institution and include multiple financial systems. The centralized database may be accessible to an automated teller machine ("ATM") having a sensor bar or other means for receiving a user's biometric signature. In this manner, the biometric signature information may replace a personal identification number and authenticate to access secure information to initiate secure transactions at the ATM (e.g., withdraw money, view account balances, etc.). The biometric authentication system according to some aspects may similarly be used to replace an identification card for initiating financial transactions in person at a branch of the financial institution.

Also, a biometric authentication system including biometric signature keys stored in a centralized database according to some aspects may allow for a modular multi-system platform. For example, new systems having secure user information may be added to the platform without requiring new authentication systems to be established for each system. The centralized database may dynamically expand to accommodate new users of each system as the biometric authentication system may be configured to generate a signature key in response to receiving a biometric signature from the new systems' sensors.

A biometric authentication system according to some aspects may be particularly useful when the user device is a wearable device. Wearable user devices are becoming more compact in light of new technologies. Concurrent with the decreasing size of wearable user devices, many entities managing secure information are increasing the complexity of the login information acceptable for access to the secure information. Inputting complex (and often lengthy) login information on a small user device (e.g., a smart watch or a smart phone) may prove difficult to the user. Using biometric signature information may allow the biometric authentication system to authenticate a user more efficiently and more effectively.

Similarly, authentication using biometric signature information may also convenience the user by limiting the unintended display of secure information on the wearable user device. Many wearable user devices are wearable by the user in a manner that secure information displayed by the wearable user device is visible to individuals in close proximity to the user. Authentication using biometric signature information may prevent secure information from being displayed until the user implements an authentication process. For example, a user may receive a message alerting corresponding to updated secure information (e.g., a posted payment, an updated financial account balance) to provide the user. The user may select an option on the wearable user device (e.g., a displayed selection option, a button on the wearable user device, etc.) to authenticate the user based on the biometric signature information prior to the updated secure information being displayed.

Additional implementations of the system, including those unrelated to authentication of the user for access to secure information (e.g., analyzing stored biometric signature information for targeted marketing and incentives based on health indicators), may become apparent to those skilled in the art without departing from the scope of this invention. The illustrative examples are provided to introduce the reader to the general subject matter discussed herein and the disclosure is not limited to these examples. The following sections describe various additional non-limiting examples.

Various aspects of the present disclosure may be implemented using various user devices. FIG. 1 is a cross-sectional schematic diagram of an environment in which a biometric signature may be obtained according to some aspects of the present disclosure. The environment includes a user device 100. The user device 100 is a wearable computing device, such as a smart watch, patch, wristband, necklace, bracelet, or other device wearable on the skin 102 and having processing means. The user device 100 includes a sensor 104 that may be placed in physical contact with the skin 102 when the user is wearing the user device 100. The sensor 104 may be a biometric sensor device that detects or measures a biometric signature 106 of the user. A user's biometric signature 106 may include wave patterns corresponding to the electrical activity of the user's heart. For example, physical contractions of the heart (e.g., heartbeats) may be caused by myocytes, cells found in muscle tissue that may initiate their own contractions without assistance from external nerves. Sinoatrial and atrioventricular nodes located in the upper-right and lower-right atriums of the heart, respectively, may coordinate a rhythmic sequence of the physical contractions. When a wave reaches the atrioventricular node, the wave may be delayed before being conducted through the cells lining the ventricles of the heart, causing the ventricles to contract and creating a unique wave pattern of the contraction. The biometric signature 106 may be unique for each individual, similar to a "fingerprint."

In some aspects, the biometric signature 106 may be detected from the pulse or blood flow in an artery 108 below the surface of the skin 102. The sensor 104 may measure the biometric signature 106 of the user and transmit it to the user device 100. Although FIG. 1 shows the user device 100 as a device wearable on the skin 102, in other aspects, the user device 100 may include any computing device communicatively coupled to or including a sensor for obtaining a biometric signature without departing from the scope of the present disclosure. Non-limiting examples of the user device 100 include a personal computer, smartphone, personal digital assistant ("PDA"), or a tablet.

The user device 100 may transmit the biometric signature 106 to an authentication system configured to store information associated with the biometric signature 106 in a centralized database or to authenticate the user of to view secure information associated with the user in the centralized database. In some aspects, the user device 100 may communicate with the system through an intermediary device. For example, the user device 100 may be a watch configured to transmit the biometric signature 106 obtained from the user to a smartphone communicatively coupled to the watch (e.g., via Bluetooth, near-field communication, etc.)

Figure 2:
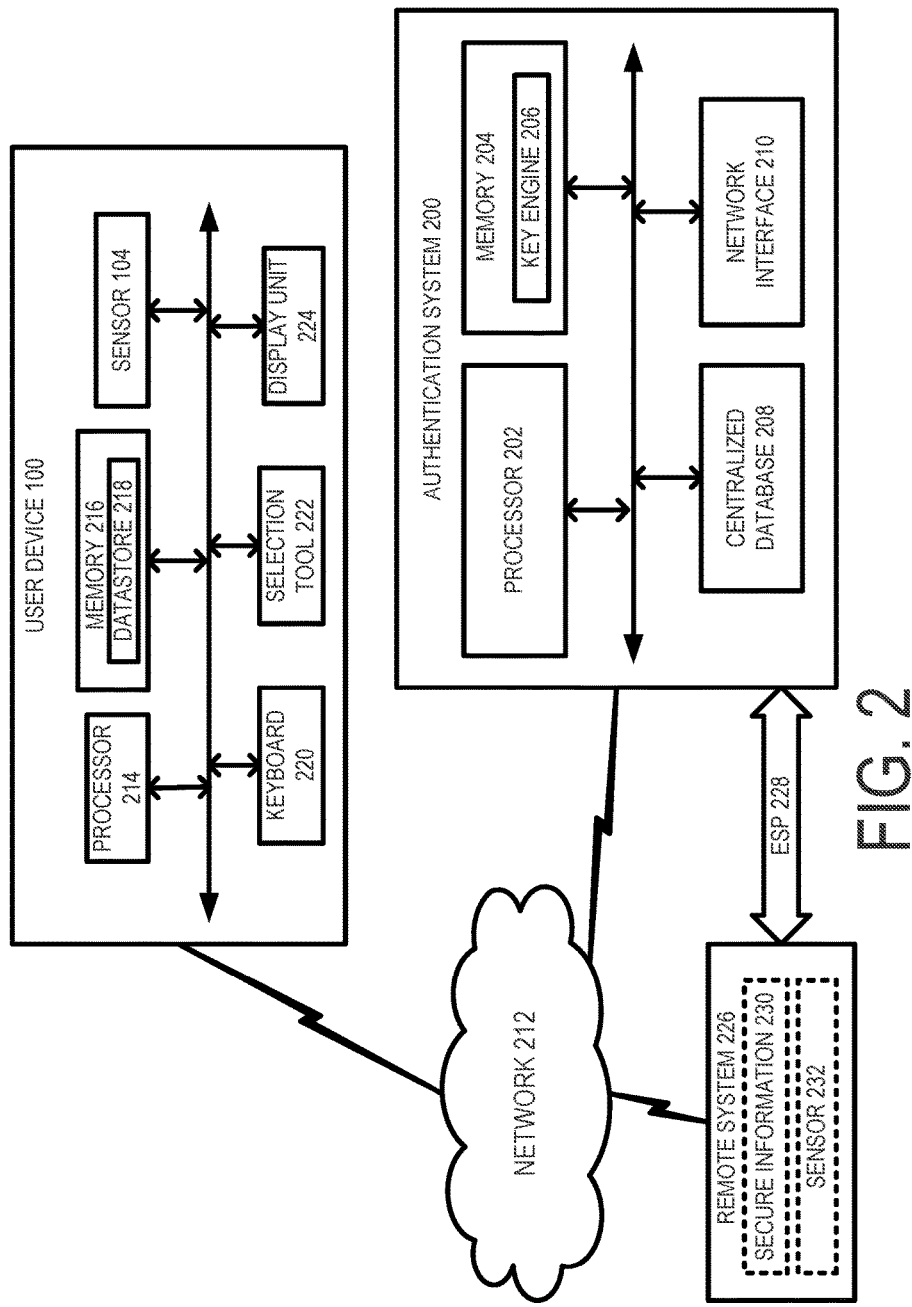
FIG. 2 is a block diagram of an authentication system for generating and storing a biometric signature key and authenticating a user using the biometric signature key according to some aspects of the present disclosure.

FIG. 2 is a block diagram of an authentication system 200 for generating and storing a biometric signature key and authenticating a user using the biometric signature key according to some aspects of the present disclosure. The authentication system includes a processor 202 and a memory 204 connected by a bus. The processor 202 may execute one or more operations for generating and storing a signature key corresponding to the biometric signature 106 obtained by the sensor 104 as described in FIG. 1. The signature key may be used to authenticate the user. The processor 202 may execute instructions stored in the memory 204 to perform the operations. The processor 202 may include one processing device or multiple processing devices. Non-limiting examples of the processor 202 include a field-programmable gate array, an application-specific integrated circuit ("ASIC"), and a microprocessor. The memory 204 may include a storage device that retains information when powered off. Non-limiting examples of the memory 204 include electrically erasable and programmable read-only memory, a flash memory, or any other type of non-volatile memory.

In some examples, at least a portion of the memory 204 may include a computer-readable medium from which the processor 202 can read instructions of the memory 204. A computer-readable medium may include electrical, optical, magnetic, or other storage devices capable of providing the processor 202 with computer-readable instructions or other program code. Non-limiting examples of a computer-readable medium include magnetic disks, memory chips, read-only memory, random-access memory, an ASIC, a configured processor, optical storage, or any other medium from which the processor 202 may read instructions. The instructions may include processor-specific instructions generated by a compiler or an interpreter from code written in any suitable computer-programming language, including, for example, C, C++, C#, COBOL, Java, etc. The instructions include an application, such as key engine 206, including one or more algorithms for generating a signature key corresponding to the biometric signature 106 of FIG. 1 by extracting unique data attributes from the biometric signature 106. In some aspects, the instructions may also cause the processor 202 to generate one or more user interfaces for displaying secure user information stored in a database accessible to the authentication system 200.

In some aspects, the key engine 206 may include instructions for filtering out noise in the biometric filter to generate true biometric signature data. For example, the key engine 206 may cause the processor 202 to apply a filter, such as a band-pass filter to the biometric signature to attenuate noise from the measurement within certain frequency ranges. The true biometric signature data may be used to extract one or more data attributes unique to the user's biometric signature as the signature key.

In additional aspects, the key engine 206 may include instructions for determining unique data attributes in a biometric signature. For example, the instructions may be configured to interpret the biometric signature to distinguish the unique attributes from attributes that are common to some or all biometric signatures. The instructions may also be configured to distinguish the unique attributes from attributes that are variable depending on measurement factors of the sensor 104. For example, the instructions may be configured to filter attributes of the biometric signature that are dependent variable factors. The variable factors may include the placement of the sensor on the skin, the rate of the user's heartbeat, or other known attributes that may change with respect to a user's biometric signature depending on the time that the biometric signature was obtained by the sensor 104.

In additional aspects, the key engine 206 may include instructions for measuring intervals or distances between certain waves of the biometric signature. For example, a biometric signature for a heartbeat may include an electrocardiogram ("EKG") having a P-wave representing the atrial depolarization of the heart, a QRS-complex corresponding to a combination of a Q-wave, R-wave, and S-wave and collectively representing ventricular depolarization, and a T wave representing ventricular repolarization. The waves may form a unique pattern and one or more intervals between certain waves may be identified and extracted as data attributes defining a signature key (e.g., the interval between a peak of the P wave and an R peak, the interval between the end of the P-wave and the R peak, the width of the P-wave, the interval between the S peak and the peak of the T-wave, etc.). In other aspects, the key engine 206 may include additional instructions for extracting unique data attributes from the biometric signature using one or more known methods.

The authentication system 200 also includes a centralized database 208. The centralized database 208 may include a secure database in which the biometric signature 106, or a signature key generated by the key engine 206 corresponding to the biometric signature 106, may be stored. The centralized database may be accessible to multiple systems of a host platform to authenticate the user of each of the multiple systems using the biometric signature information.

The authentication system 200 also includes a network interface 210. The network interface 210 may be coupled to the processor 202 and the memory 204 via the bus. The network interface 210 may include a network card or other device communicatively coupled to a network 212 to allow user devices, such as the user device 100, to access the centralized database 208 for authenticating the user to view secure information on the user device. In some aspects, the network interface 210 may transmit user interfaces generated by the key engine 206 via the network 212 including the secure information.

The user device 100 includes a processor 214 and a memory 216 connected to a bus. The processor 214 may include one or more processors, including without limitation one or more general-purpose processors or one or more special-purpose processors ((such as digital signal processing chips, graphic acceleration processors, etc.). The processor 214 may execute one or more operations for receiving biometric signature information from the sensor 104 and transmitting, via a communication device, the biometric signature information to the authentication system 200 via the network. The processor 214 may execute instructions stored in the memory 216 to perform the operations. Non-limiting examples of the processor 214 may include a field-programmable gate array ("FPGA"), an application-specific integrated circuit ("ASIC"), a microprocessor, etc.

The memory 216 may include any type of storage device that retains stored information when powered off. Non-limiting examples of the memory 216 may include electrically erasable and programmable read-only memory ("EEPROM"), a flash memory, or any other type of non-volatile memory. In some examples, at least a portion of the memory 216 may include a non-transitory computer-readable medium from which the processor 214 can read the instructions. A computer-readable medium may include electronic, optical, magnetic, or other storage devices capable of providing the processor 214 with computer-readable instructions or other program code. Non-limiting examples of computer-readable medium include, but are not limited to, magnetic disks, memory chips, ROM, random-access memory ("RAM"), an ASIC, a configured processor, optical storage, or any other medium from which a computer processor can read the instructions. The instructions may include processor-specific instructions generated by a compiler or an interpreter from code written in any suitable computer-programming language, including, for example, C, C++, C#, Java, etc. In some aspects, the memory 216 may also include storage space (e.g., datastore 218) in which content and data may be stored. For example, in some aspects, the datastore 218 may store a local copy of the biometric signature 106 or the signature key generated by the authentication system 200.

The user device 100 also includes a keyboard 220, a selection tool 222, and a display unit 224. The keyboard 220, the selection tool 222, and the display unit 224 may be coupled to the processor 214 and the memory 216 via the bus. The keyboard 220 may be physical keyboard or may be a virtual keyboard displayed on the display unit 224 and selectable by the account holder via the selection tool 222 to input alphanumeric and other characters (e.g., a touchscreen keyboard). The selection tool 222 may include a mouse, a touchpad, a touch screen, or other suitable means to allow an account holder to select items or other available selections presented to the account holder on the display unit 224. The display unit 224 may display user interfaces generated by the authentication system 200. In some aspects, the display unit 224 may include any CRT, LCD, OLED, or other device for displaying the user interfaces.

Although the authentication system 200 is shown as communicatively coupled to the user device 100 by the network 212, one or more intermediary computing devices may be positioned in the communication path between the user device 100 and the authentication system 200. For example, the user device 100 may be communicatively coupled to an intermediary user device, such as a laptop, mobile phone, desktop computer, personal digital assistant, tablet, etc. The intermediary user device may be communicatively coupled to the authentication system 200 via the network 212. The authentication system 200 may receive requests and commands from the user device 100 through the intermediary user device and configure the user interfaces to be provided to the user device 100 through the intermediary user device in response to the requests and commands.

One or more additional systems may be coupled to the authentication system 200 to access the centralized database 208 and authenticate the user. For example, FIG. 2 shows a remote system 226 coupled to the authentication system 200 and the user device 100 via the network 212. In one example, the user device 100 may access the remote system 226 to view secure information 230 stored in a database or other storage device of the remote system 226. In another example, the user device 100 may access the remote system 226 to access secure information for conducting a transaction. The remote system 226 may access the authentication system 200 via the network 212 to authenticate the user. The remote system 226 also be communicatively coupled to the authentication system via an enterprise service bus 228 in addition to, or alternatively to, the network 212. The enterprise service bus 228 may include architecture to allow different systems to privately communicate outside of a public network, such as the Internet. In some aspects, the remote system 226 may access the centralized database 208 via the enterprise service bus 228 to authenticate the user. In additional and alternative aspects, the remote system 226 and the authentication system may be communicatively coupled via a wireless or wired network separate from the network 212.

In some aspects, the remote system 226 may include a sensor 232 in addition to, or alternatively to, the secure information. For example, the remote system 226 may include a physical bank having a sensor 232 to authenticate a user to deposit or withdraw money into a user's account. The sensor 232 may be similar to the sensor 104 of the user device 100. For example, the sensor 232 may be placed in contact with a user's skin to obtain a biometric signature of the user that may be transmitted from the remote system 226 to the authentication system 200 via the network 212, the enterprise service bus 228, or another network for authenticating the user.

Figure 3:
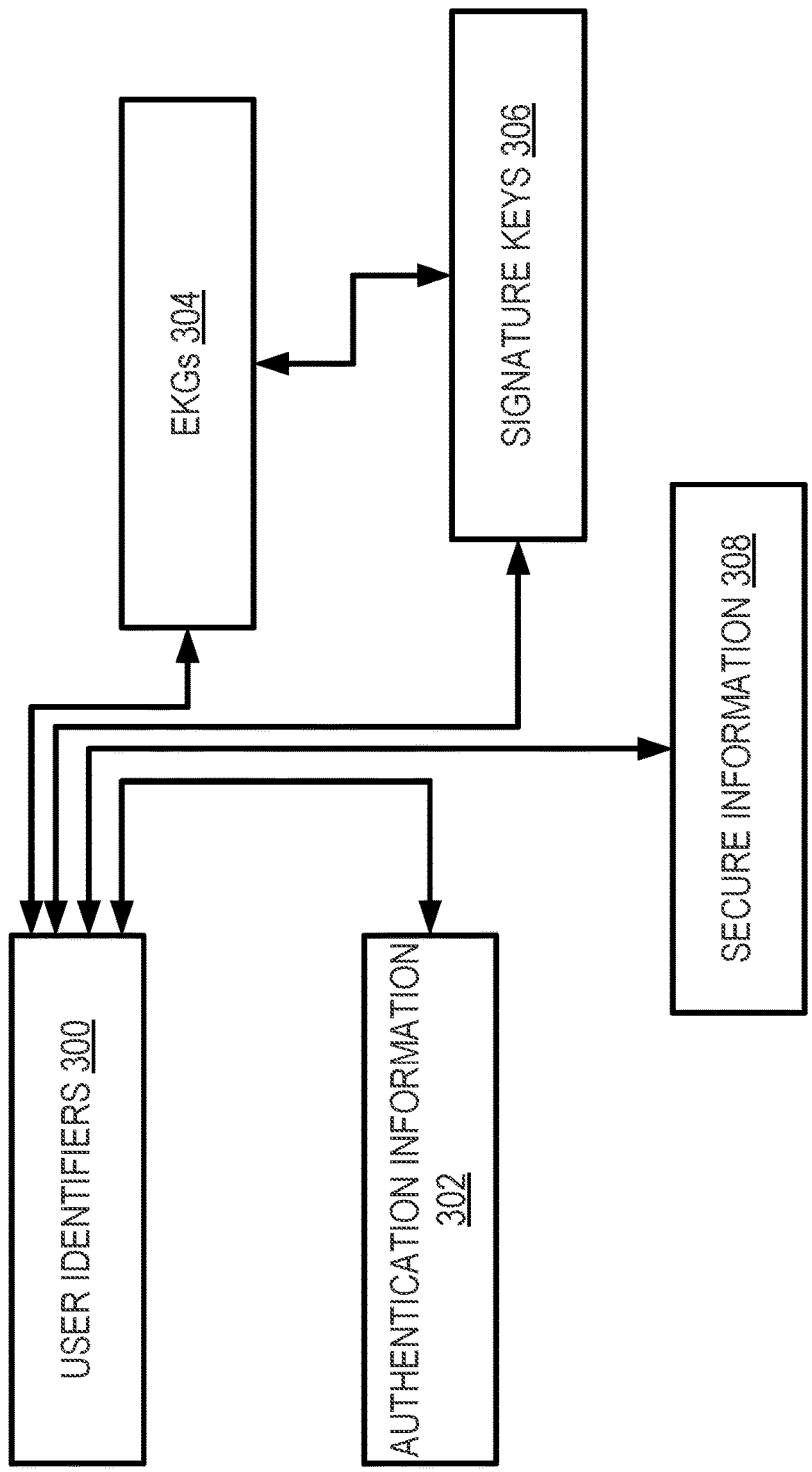
FIG. 3 is a block diagram depicting memory locations in a centralized database of the system of FIG. 2 according to some aspects of the present disclosure.

FIG. 3 is a block diagram depicting memory locations in a centralized database 208 according to some aspects of the present disclosure. The centralized database 208 may associate information within each location to authenticate a user. In some aspects, the information within each location may be associated in one or more indices in the centralized database 208. For example, an index may include one or more columns, each including information that is associated with other information in the same column of the index. In additional and alternative aspects, the information may be associated using pointers, objects, or other means for associating information in the centralized database 208. In some aspects, the information stored in the centralized database 208 may be separated or partitioned by information type to allow the processor 202 of the authentication system 200 of FIG. 2 to query information based on a first type and use the associations to determine information of a second type associated with the first type of information.

User identifiers 300 are stored in the centralized database 208 and include information corresponding to an identity of an account holder, member, or other user of the authentication system 200 (or a remote system 226 in communication with the authentication system 200). In some aspects, the user identifiers 300 may include a unique set of alphanumeric characters, such as an online banking ("OLB") number assigned to accountholders to distinguish holders of each account managed by a financial institution. In other aspects, the unique user identifiers 300 may include a unique set of alphanumeric characters provided by or issued to each user, including, but not limited to, a social security number. The user identifiers 300 may be associated with authentication information 302, electrocardiograms ("EKGs") 304, signature keys 306, and, in some aspects, secure information 308 stored in the centralized database 208.

The authentication information 302 may include information that may be used to authenticate the account holder to view the secure information 308 stored in the centralized database 208 or in databases of remote systems. In some aspects, the authentication information 302 may include information provided by the user, including, but not limited to, a username, password, social security number, passcode, or other authenticating information. In other aspects, the authentication information 302 may include information provided to the user, such as, but not limited to, a personal identification number ("PIN"). The authentication information 302 may be stored in the centralized database 208 and compared with input from the user via the user device 100 of FIGS. 1 and 2 for a match to conclude that the user is authorized to view the secure information 308. In additional and alternative aspects, the authentication information 302 may be used to associate a biometric signature received from the user device 100 with an appropriate user. For example, the authentication system 200 may receive the biometric signature and determine a user identifier 300 to associate the biometric signature with by first requiring the user to enter authentication information 302 already associated with the user identifier 300 in the centralized database 208.

The centralized database 208 also includes EKGs 304. The EKGs 304 may include copies of the biometric signature 106 received from the user device 100. In some aspects, the centralized database 208 may store the EKGs 304 in the centralized database 208 temporarily to generate the signature keys 306. In other aspects, the centralized database 208 may store the EKGs 304 longer-term. For example, the EKGs 304 may be used as a backup for the signature key 306 (e.g., to recreate a signature key 306 in case a file corresponding to the signature key 306 is corrupted). In another example, the EKGs 304 may be used for non-authenticating purposes, such as targeted marketing for products and services based on health analyses performed using the EKGs 304. The signature keys 306 may be associated with the user identifiers 300 and the EKGs 304. The signature keys 306 may include, for each EKG 304, a unique set of data attributes extracted from the biometric signature corresponding to the EKGs 304. In some aspects, the signature keys 306 may include a subset of the EKGs 304. In other aspects, the signature keys 306 may include data attributes or data points from the EKGs 304.

The centralized database 208 also includes secure information 308. In some aspects, the secure information 308 may include account information corresponding to a financial account held by the user (e.g., a personal checking account, a savings account, etc.). In some aspects, the secure information 308 may represent points or objects to secure information physically stored on another database. In other aspects, the secure information 308 may represent information physically stored in the centralized database 208.

In one example, the secure information 308 may include balance information corresponding to a checking account held by the user. The secure information 308 may be associated with the user identifiers 300 to allow the secure information 308 to be retrieved subsequent to authenticating the user using the signature key 306 or the authentication information 302. For example, a user may enter a biometric signature that is processed by the authentication system 200 to extract unique data attributes. The data attributes may be compared with each of the signature keys 306 to determine a match. If a match is determined, the authentication system 200 may determine the user identifier 300 associated with the matching signature key 306. The authentication system 200 may retrieve secure information 308 associated with the user identifier 300 identified and transmit the secure information 308 for display on the user device 100.

Figure 4:
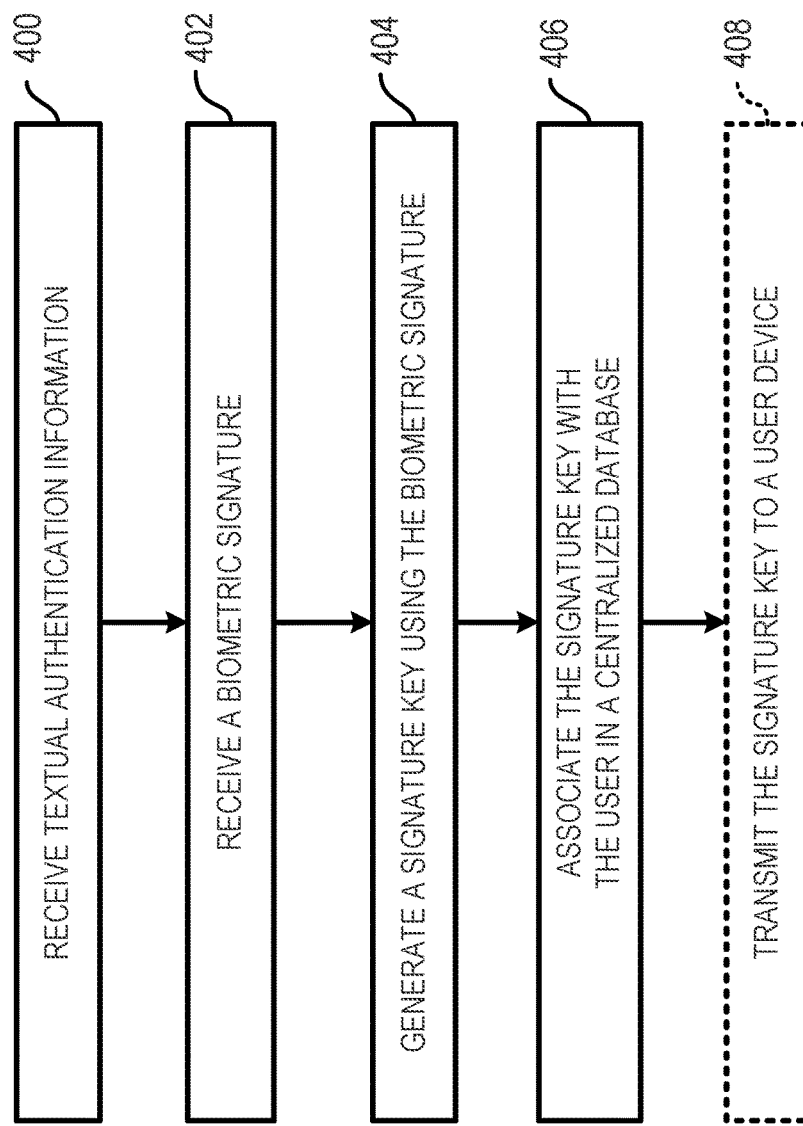
FIG. 4 is a flow chart of a process for generating a biometric signature key according to some aspects of the present disclosure.

FIG. 4 is a flow chart of a process for generating a signature key according to some aspects of the present disclosure. The process is described with reference to FIGS. 1-3, unless otherwise indicated, though other implementations are possible without departing from the scope of the present disclosure.

In block 400, the processor 202 receives textual authentication information. The textual authentication information may correspond to authentication information 302 stored in the centralized database 208. In one example, the textual authentication information may include user login information received by the authentication system 200 in response to user input from a displayed user interface on the user device 100. In some aspects, the user login information may include information such as a username, password, or personal identification number, inputted by the user via an interface generated and displayed by the key engine 206 or a software application stored on the user device 100.

In some aspects, the processor 202 may receive the textual authentication information from the user device 100 via the network 212 and compare it with authentication information 302 stored in the database to determine a match. The processor 202 may identify a user identifier 300 associated with the authentication information 302 found to match the textual authentication information entered on the user device 100.

In block 402, a biometric signature 106 is received. In some aspects, the biometric signature 106 may be obtained by a sensor 104 of the user device 100 and transmitted by the user device 100 via the network 212 to the authentication system 200. In other aspects, the biometric signature 106 may be obtained by a sensor 232 of the remote system 226 and transmitted to the authentication system 200 via the network 212 or the enterprise service bus 228. In some aspects, the processor 202 may receive the biometric signature 106 and store it as an EKG 304 in the centralized database 208.

In block 404, a signature key is generated using the biometric signature 106. In some aspects, the processor 202 may execute instructions from the key engine 206 and extract unique data attributes from the EKG 304 corresponding to the biometric signature 106 for the signature key. For example, the unique data attributes may include intervals between wave peaks in the biometric signature 106. In some aspects, the processor 202 may process the biometric signature prior to extracting the unique data attributes. For example, the processor 202 may apply a filter to the biometric signature 106 to separate the biometric information from noise generated in obtaining or transmitting the biometric signature 106 to the authentication system 200.

In block 406, the signature key is associated with the user in the centralized database 208. In some aspects, the signature key may be stored in a list of signature keys 306 in a manner that associates the signature key with a user identifier 300. For example, as described in FIG. 3, the signature key may be associated with a user identifier 300 via an object, pointer, or by some other means.

In block 408, the signature key may be optionally transmitted to the user device 100. For example, in some aspects, the user device 100 may include a software application operating using a client-side engine corresponding to the key engine 206 of the authentication system 200. In some aspects, the user device 100 may store a copy of the signature key in the datastore 218 of the user device 100 to allow the user device 100 to authenticate the user locally. In other aspects, the signature key may be stored locally as a backup in the event of a breach or corruption of the centralized database 208, or for other purposes, such as authentication the user device 100 instead of, or in addition to, authenticating the user.

Figure 5:
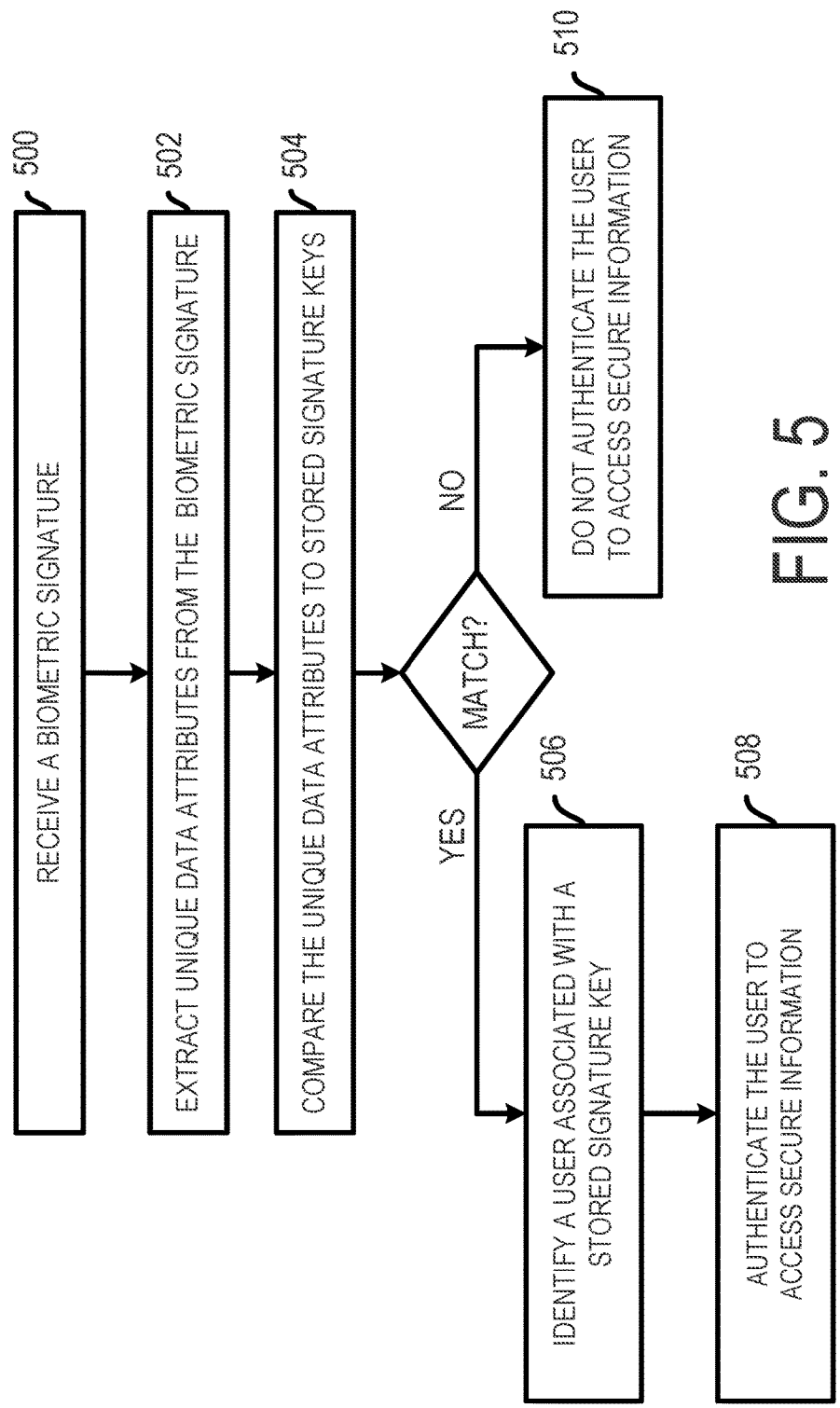
FIG. 5 is a flow chart of a process for authenticating a user using a biometric signature key according to some aspects of the present disclosure.

FIG. 5 is a flow chart of a process for authenticating a user using a biometric signature key according to some aspects of the present disclosure. The process is described with reference to FIGS. 1-3, unless otherwise indicated, though other implementations are possible without departing from the scope of the present disclosure.

In block 500, a biometric signature is received. The biometric signature may be received by the processor 202 of the authentication system 200 from the user device 100. In some aspects, the biometric signature may be obtained by the sensor 104 of the user device 100 and transmitted to the authentication system 200 via the network 212.

In block 502, unique data attributes may be extracted from the biometric signature. In some aspects, the processor 202 may execute instructions of the key engine 206 to extract the data attributes similar to the process for generating a signature key described in block 404 of FIG. 4. For example, the unique data attributes may correspond to intervals between wave peaks in the biometric signature.

In block 504, the unique data attributes are compared to signature keys 306 stored in the centralized database 208. In some aspects, the comparison may include a direct comparison of the attributes with the signature keys 306 to determine an exact match. In other aspects, the comparison may include a relational comparison to determine a match. For example, the unique data attributes may correspond to intervals or distances between different portions of different waves of the biometric signature, such as intervals between wave peaks in the biometric signature. The specific interval between each peak may change depending on factors such as heart rate or the health of the user during a sensor measurement, but the relationship or ratio between different intervals may remain constant. The comparison between the attributes and the stored signature keys 306 may then take into account the ratios between different attributes in determining a match.

In block 506, if a match is determined between the unique data attributes and a stored signature key 306, the processor 202 identifies the user associated with the stored signature key 306 matching the unique data attributes. Each signature key 306 may be associated with a user identifier 300 in the centralized database 208. The processor 202 may use the user identifier 300 associated with the signature key 306 to determine the user.

In block 508, the user may be authenticated. In some aspects, the secure information associated with the user may be transmitted to the user device 100 for display on the display unit 224. In some aspects, the identified user identifier 300 associated with the matching signature key 306 may include secure information associated in a database. The processor 202 or network interface 210 may transmit the secure information 308 to the user device 100 via the network 212 for display. In additional and alternative aspects, the user may be authenticated to access the secure information for conducting a secure transaction.

In block 510, if a match is not determined between the unique data attributes and a stored signature key 306, the user is not authenticated. No secure information may be transmitted to the user device 100 or accessed by the user. In some aspects, the processor 202 may generate a user interface including a message indicating that the user is not authenticated to view secure information on the user device 100.

In some aspects, the user may wish to view secure information 230 stored in a database of a remote system 226 or accessible to the remote system 226 from another database. The user may additionally wish to conduct a secure transaction from the remote system 226 using the secure information. In one example, the remote system 226 may include an ATM machine. The user may place his hands onto, or otherwise contact, the sensor 232 of the remote system 226. The sensor 232 may obtain a biometric signature from the remote system 226 and transmit the biometric signature to the authentication system 200 via the network 212 or the enterprise service bus 228 for authenticating the user as described in blocks 500-506. If the user is authenticated, the authentication system 200 may transmit an authentication signal to the remote system 226. In some aspects, the authentication signal may indicate that the user is authenticated to view secure account information or conduct a secure transaction using the secure account information in the remote system 226. In other aspects, the authentication signal may correspond to user identification information that may be compared to user identification information in a database of the remote system 226 to retrieve the appropriate secure information. If the user is not authenticated by the authentication system 200, the user may be required to enter conventional authentication information (e.g., a PIN) or be denied access to the secure account information, as described in block 510.

The foregoing description of the examples, including illustrated examples, of the invention has been presented only for the purpose of illustration and description and is not intended to be exhaustive or to limit the invention to the precise forms disclosed. Numerous modifications, adaptations, and uses thereof will be apparent to those skilled in the art without departing from the scope of this invention. The illustrative examples described above are given to introduce the reader to the general subject matter discussed here and are not intended to limit the scope of the disclosed concepts.

What is claimed is:

1. A biometric authentication system, comprising:
   a centralized database communicatively couplable to one or more external systems and including stored biometric signature information for authenticating a user;
   a processor communicatively coupled to the centralized database; and
   a memory communicatively coupled to the processor and including instructions executable by the processor for causing the processor to:
   receive a first electrocardiogram (EKG) for the user from a biometric sensor of a user device, the first EKG being a single continuous waveform indicating heartbeat information for the user;
   based on receiving the first EKG, generate biometric signature information for the user by extracting a first set of data attributes from the first EKG, wherein the first set of data attributes includes a first distance between two or more waves in the first EKG obtained by:
   identifying the two or more waves in the first EKG;
   determining that the first distance is a distance between a first point on a first wave of the two or more waves and a second point on a second wave of the two or more waves;
   transmit the biometric signature information back to the user device for local storage on the user device, the biometric signature information stored on the user device being usable for local authentication on the user device;
   store the biometric signature information in the centralized database as a stored signature key;
   associate the stored signature key with user identifier information corresponding to the user in the centralized database;
   subsequent to associating the stored signature key with the user identifier information in the centralized database, receive a second EKG from the user device;
   extract a second set of data attributes from the second EKG to form a biometric signature for the user at least in part by:
   generating a processed version of the second EKG by applying a filter to the second EKG to attenuate noise included in the second EKG; and
   extracting the second set of data attributes from the processed version of the second EKG by:
   identifying the first point on the first wave and the second point on the second wave in the second EKG,
   determining a second distance between the first point on the first wave and the second point on the second wave in the second EKG, and
   including the second distance as a data attribute in the second set of data attributes;
   compare the second set of data attributes to the stored signature key in the centralized database, the centralized database including a plurality of signature keys, each signature key of the plurality of signature keys corresponding to a stored set of data attributes extracted from corresponding biometric signatures of a plurality of users;
   identify the user identifier information associated with the stored signature key of the plurality of signature keys in response to the second set of data attributes matching the stored signature key; and
   authenticate the user to access secure information associated with the user identifier information in response to the second set of data attributes matching the stored signature key.

2. The biometric authentication system of claim 1, wherein the memory includes additional instructions executable by the processor to cause the processor to transmit the secure information to the user device via a network for display on a display unit of the user device.

3. The biometric authentication system of claim 1, wherein the one or more external systems includes a remote system communicatively coupled to the biometric authentication system via an enterprise service bus.

4. The biometric authentication system of claim 1, wherein the one or more external systems includes a remote system communicatively coupled to the biometric authentication system,
   wherein the secure information is stored in a database accessible to the remote system, the database being a different database than the centralized database,
   wherein the memory includes instructions executable by the processor to cause the processor to authenticate the user to access the secure information by transmitting the user identifier information to the remote system to determine the secure information associated with the user identifier information in the database.

5. The biometric authentication system of claim 1, wherein the two or more waves include at least two of: a P-wave, a Q-wave, an R-wave, an S-wave, or a T-wave of the first EKG.

6. The biometric authentication system of claim 1, wherein the first point is a first wave peak in the first EKG and the second point is a second wave peak in the first EKG.

7. The biometric authentication system of claim 1, wherein the secure information includes account information corresponding to a bank account held by the user at a financial institution.

8. The biometric authentication system of claim 1, wherein the memory includes additional instructions executable by the processor to cause the processor to transmit a copy of the biometric signature information back to the user device for use as a backup copy of the biometric signature information.

9. A method, comprising:
   receiving, by a processing device, a first electrocardiogram (EKG) for a user from a biometric sensor of a user device, the first EKG being a single continuous waveform indicating heartbeat information for the user;
   based on receiving the first EKG, generating, by the processing device, biometric signature information for the user by extracting a first set of data attributes from the first EKG, wherein the first set of data attributes includes a first distance between two or more waves in the first EKG obtained by:
   identifying the two or more waves in the first EKG;
   determining that the first distance is a distance between a first point on a first wave of the two or more waves and a second point on a second wave of the two or more waves;
   transmitting, by the processing device, the biometric signature information back to the user device for local storage on the user device, the biometric signature information stored on the user device being usable for local authentication on the user device;

storing, by the processing device, the biometric signature information in a centralized database as a stored signature key;

associating, by the processing device, the stored signature key with user identifier information corresponding to the user in the centralized database;

subsequent to associating the stored signature key with the user identifier information in the centralized database, receiving, by the processing device, a second EKG from the user device;

extracting, by the processing device, a second set of data attributes from the second EKG to form a biometric signature for the user at least in part by:
generating a processed version of the second EKG by applying a filter to the second EKG to attenuate noise included in the second EKG; and
extracting the second set of data attributes from the processed version of the second EKG by:
identifying the first point on the first wave and the second point on the second wave in the second EKG,
determining a second distance between the first point on the first wave and the second point on the second wave in the second EKG, and
including the second distance as a data attribute in the second set of data attributes;

comparing, by the processing device, the second set of data attributes to the stored signature key in the centralized database accessible to one or more systems, the centralized database including a plurality of signature keys, each signature key of the plurality of signature keys corresponding to a stored set of data attributes extracted from corresponding biometric signatures of a plurality of users;

identifying, by the processing device, the user identifier information associated with the stored signature key of the plurality of signature keys in response to the second set of data attributes matching the stored signature key; and authenticating, by the processing device, the user to access secure information associated with the user identifier information in response to the second set of data attributes matching the stored signature key.

10. The method of claim 9, further comprising receiving textual authentication information, wherein associating the stored signature key with the user identifier information includes identifying the user identifier information associated with stored authentication information that is stored in the centralized database and matches the textual authentication information.

11. The method of claim 9, further comprising transmitting a copy of the biometric signature information back to the user device for use as a backup copy of the biometric signature information should the centralized database fail.

12. A non-transitory computer-readable medium comprising program code that is executable by a processor to cause the processor to:
receive a first electrocardiogram (EKG) for a user from a biometric sensor of a user device, the first EKG being a single continuous waveform indicating heartbeat information for the user;
based on receiving the first EKG, generate biometric signature information for the user by extracting a first set of data attributes from the first EKG, wherein the first set of data attributes includes a first distance between two or more waves in the first EKG obtained by:
identifying the two or more waves in the first EKG;
determining that the first distance is a distance between a first point on a first wave of the two or more waves and a second point on a second wave of the two or more waves;
transmit the biometric signature information back to the user device for local storage on the user device, the biometric signature information stored on the user device being usable for local authentication on the user device;
store the biometric signature information in a centralized database as a stored signature key;
associate the stored signature key with user identifier information corresponding to the user in the centralized database;
subsequent to associating the stored signature key with the user identifier information in the centralized database, receive a second EKG from the user device;
extract a second set of data attributes from the second EKG to form a biometric signature for the user at least in part by:
generating a processed version of the second EKG by applying a filter to the second EKG to attenuate noise included in the second EKG; and
extracting the second set of data attributes from the processed version of the second EKG by:
identifying the first point on the first wave and the second point on the second wave in the second EKG,
determining a second distance between the first point on the first wave and the second point on the second wave in the second EKG, and
including the second distance as a data attribute in the second set of data attributes;
compare the second set of data attributes to the stored signature key in the centralized database accessible to one or more systems, the centralized database including a plurality of signature keys, each signature key of the plurality of signature keys corresponding to a stored set of data attributes extracted from corresponding biometric signatures of a plurality of users;
identify the user identifier information associated with the stored signature key of the plurality of signature keys in response to the second set of data attributes matching the stored signature key; and
authenticate the user to access secure information associated with the user identifier information in response to the second set of data attributes matching the stored signature key.

13. The non-transitory computer-readable medium of claim 12, wherein the program code is executable by the processor to cause the processor to:
receive textual authentication information; and
associate the stored signature key with the user identifier information by identifying the user identifier information associated with stored authentication information that is stored in the centralized database and matches the textual authentication information.

14. The non-transitory computer-readable medium of claim 12, wherein the program code is executable by the processor to cause the processor to:
transmit a copy of the biometric signature information back to the user device for use as a backup copy of the biometric signature information; and in response to a failure of the centralized database, obtain the copy of the biometric signature from the user device for use in authenticating the user device.

* * * * *